May 24, 1938.  S. ASBURY  2,118,544
TRACTOR DRAW AND HITCH
Filed April 17, 1936  2 Sheets-Sheet 1

INVENTOR:
Stanley Asbury
BY David E. Carlsen
ATTORNEY.

May 24, 1938.  S. ASBURY  2,118,544
TRACTOR DRAW AND HITCH
Filed April 17, 1936  2 Sheets-Sheet 2
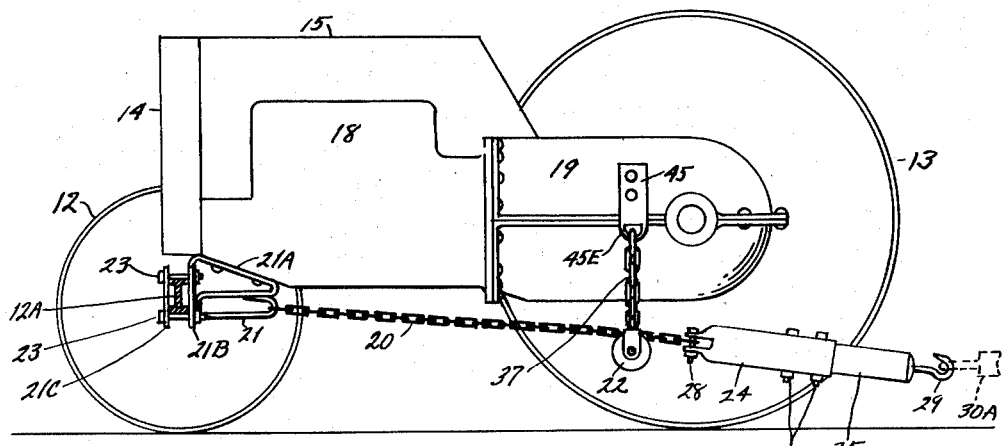
Fig. 8.
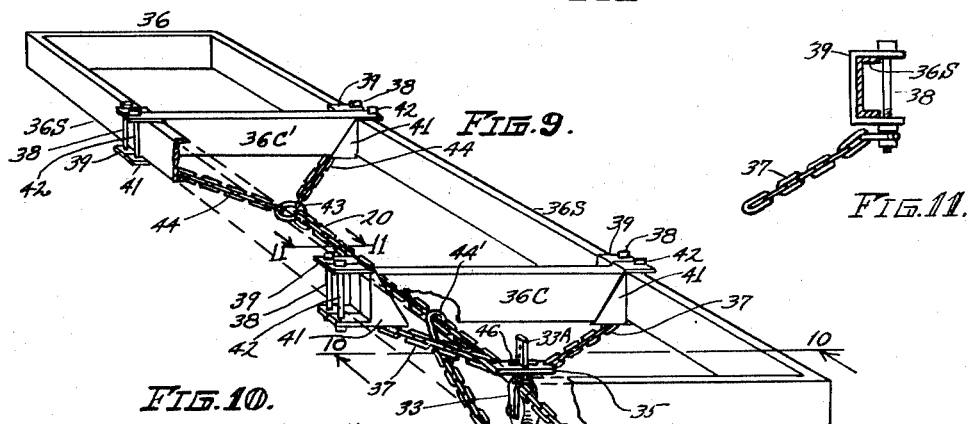
Fig. 9.
Fig. 11.
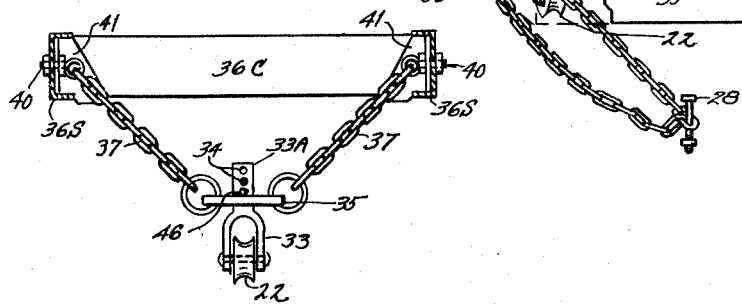
Fig. 10.
INVENTOR:
Stanley Asbury
BY David E. Carlsen
ATTORNEY.

Patented May 24, 1938

2,118,544

UNITED STATES PATENT OFFICE 2,118,544

TRACTOR DRAW AND HITCH

Stanley Asbury, St. Paul, Minn.

Application April 17, 1936, Serial No. 74,967

3 Claims. (Cl. 280—33.44)

My invention relates to a combination draw bar and hitch device for tractors and involves new and unique draw bar means attachable to implements to be drawn by a tractor and also means combined with said draw bar which cause the tractor pull to be exerted from the front central part. The main object is to provide a traction and hitch member so constructed that its point of connection with an implement is at a lower level than the point on the tractor at which the pull is exerted, forward of the drive wheels, thereby causing not only stability of the entire tractor but exerting a downward pull which eliminates possible upsetting or tipping of the tractor on hard pulls. Traction on the drive wheels is also increased. Further objects and advantages of my device are hereinafter fully set forth and illustrated in the accompanying drawing, in which:—

Fig. 8 is a longitudinal elevation of a tractor of different type than that shown in Fig. 1 and showing my device applied thereto with modified connection means at the front end of the tractor.

Fig. 9 is a perspective view of a structural steel frame of a tractor and certain adjustable draw means of my device.

Fig. 10 is a transverse sectional elevation as on line 10—10 in Fig. 9 and including certain modified chain connection means to the tractor frame.

Fig. 11 is a sectional detail of the right side frame 36S with a clamp 39 affixed thereto and a portion of the chain 37 extending downwardly therefrom.

Figure 1:
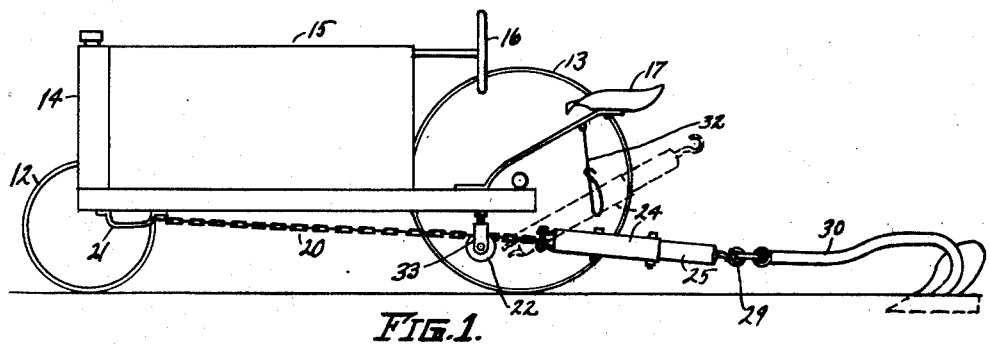
Fig. 1 is a side view of my device as used on a tractor, the tractor shown diagrammatically in longitudinal section, my draw device shown connected to a plow drawn in the usual manner behind a plow.

Referring to the drawing by reference characters I have illustrated two of the most common types of tractors to either of which my device is applicable. In either form 12 designates the usual front steering wheels, 13 the drive wheels, 14 the radiator, 15 the engine hood, 16 the steering wheel and 17 is the driver's seat. In Fig. 1 is illustrated the type of tractor having a structural steel main frame whereas in Fig. 8 is shown the so-called Fordson type of tractor in which the motor block 18 and transmission and differential housing 19 are integrally constructed and no structural steel main frame is involved.

My device comprises mainly two associated parts hereinafter called the draw member and the hitch member, of which the draw member consists of chain means extending longitudinally under the tractor, the hitch member connected to the draw member at or just below the rear end of the tractor and is provided with means for connection to an implement. The draw chain is flexibly supported at a predetermined height near the rear axle by means to be described.

The draw member comprises in part a chain 20 extending centrally and longitudinally under the tractor, its front end securable, as shown in Fig. 1, to an elongated U-shaped bracket 21 fixed to the under side of the tractor main frame centrally and longitudinally and at or near the front end of said main frame. From this forward end the chain extends toward the rear of the tractor being flexibly supported at or near the rear axle of the tractor by a vertically adjustable sheave 22 which is located centrally of and below the transmission or rear axle at a predetermined height such that the chain extends rearwardly and downwardly from its front terminal to and on said sheave thence continuing rearwardly and connected to the front end of my implement hitch device.

The above described front connection for the draw chain is for tractors having a structural steel frame. For the type of tractor shown in Fig. 8 said front connection must be modified and may comprise the hitch 21 welded or otherwise secured to a triangular open frame 21A, a sloping face of which is secured to the inclined under side of the front end of the engine 18, the front end of said frame comprising a vertical plate 21B contacting the rear face of the front wheel axle 12A. 21C is a front plate parallel to 21B at the front side of the axle and connected rigidly with the frame 21A—21 by bolts 23. Thus the strain of chain 20 pulling at 21 is taken by the bracket as a whole and transmitted to the axle and the front end of the cast engine block 18.

Figure 2:
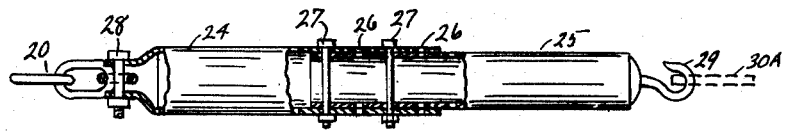
Fig. 2 is a partly sectional side elevation of a desirable form of implement hitch shown in Fig. 1, in enlarged scale.
Figure 3:
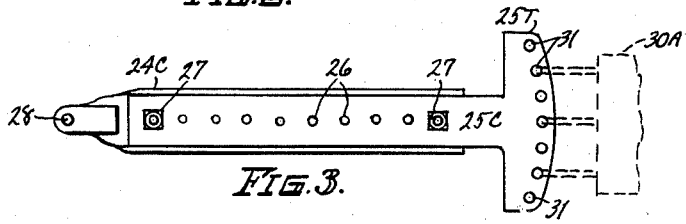
Fig. 3 is a modification of Fig. 2 but comprising a top view of the modified hitch and Fig. 4 is an edge or side view of Fig. 3.
Figure 4:
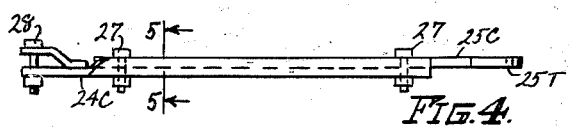
Figure 5:
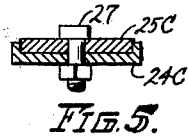
Fig. 5 is a transverse sectional view as on line 5—5 in Fig. 4.

The implement hitch member of my improved tractor hitch and draw device is an elongated telescopic device the main body of which may comprise two tubular members, 24 and 25, slidable one within the other, 24 being the front member and 25 the inner and rear member. These two may be of round tubing as shown in Figs. 1 and 2, square tubing as in Figs. 6 and 7, or they may comprise a forward channel shaped member 24C in which is adjustably retained a flat metal bar member 25C (see Figs. 3, 4, and 5). In either type there is a row of apertures 26 in each of the two members, identically spaced, and therefore enabling an operator to overlap the two members as desired and bolt them together as with bolts 27.

Figure 6:
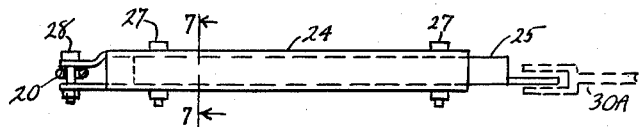
Fig. 6 is a modification of Fig. 2
Figure 7:
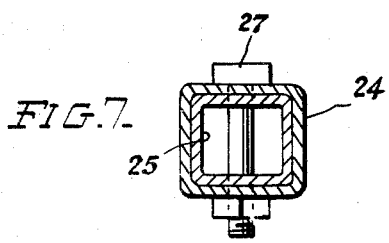
Fig. 7 is a transverse sectional view as on line 7—7 in Fig. 6.

In all forms of the hitch member the front terminus of its part 24 may be bifurcated and bored for a normally vertical bolt 28 on which any link of the chain 29 may be engaged, as best shown in Figs. 2 and 6. The rear end of member 25 of the hitch device may be provided with a hook 29 or the like for readily attaching it to any implement to be drawn by the tractor. In Fig. 1 the hook 29 is shown connected to a plow 30 whereas in Figs. 2, 3, and 6, 30A designates any implement.

Two types of preferred construction of hitch members are shown in Figs. 3 to 7 inclusive. The flat bar and channel type shown in Figs. 3, 4, and 5 involves besides the construction previously described, a T-head rear end part of member 25C designated 25T in which is provided a row of holes 31 in any one or more of which connection may be made with an implement 30A. Obviously in the form of hitch just described the implement connection is in line with the draw chain connection at 28 and this flat type of hitch automatically lines up with the draw chain when pull is exerted and there is no tilting tendency.

When the hitch member is disconnected it may be suspended under the seat 17 by any suitable means preferably in a loop 32 of wire or cable (see Fig. 1).

In the installation of my device on a tractor the sheave 22 must be set at an elevation higher than the hitch connection with the implement but lower than the draw connection at the front of the tractor. Therefore when the tractor is pulling an implement the taut draw member will bear down on the sheave 22 and the front part of the tractor simultaneously. The greater the pull the greater will be the downward pressure at 21—22 providing better traction for the drive wheels 13 and simultaneously pressing the steering wheels downwardly for better ground contact.

A feature of my invention is the positive yet transversely flexible draw-bar contact and guide at 22 when the tractor is in action. The sheave 22 is retained in an upright block 33 with an integral flat bar 33A extending upwardly, with a row of apertures 34. Said bar is projectible upwardly through a horizontal plate 35 preferably suspended centrally between the parallel side bars 36S of the tractor main frame 36 as by means of chains 37 (see Figs. 8, 9, 10, and 11). Said chains 37 may have their outer ends secured in any suitable manner to the frame, as by bolts 38 of a U-clamp 39 straddling the frame at predetermined location such that the plate 35 is located to suit, relative to the rear end of the tractor. Obviously the clamps 39 are adjustable to any desired position on the main frame to locate the sheave as may be required. In Fig. 10 the suspension chains 37 are shown with their outer ends retained in eyebolts 40. The said bolts may be in a fixed location of frame 36S or may be one of a pair or more bolts which retain the stirrup casting 41, a pair of such castings holding the ends of a cross frame member 36C.

In Fig. 9 the stirrups 41 are of clamplike form with outward flanges to engage one above and one below the corresponding flanges of the main frame side bars 36S and exteriorly of said flanges to be clamped thereon each by a vertical bolt 42. The cable retaining clamps 39 are placed directly forward of said stirrups. Obviously this construction allows for locating the frame bars 36C in any desired location along the rear part of the main frame and the guide suspension chains 37 likewise.

Further, in Fig. 9, the front end of the chain 29 is not connected to a rigid hitch, but is connected centrally of and under the main frame to a ring 43 from which extend upwardly to both sides a pair of suspension chains 44 corresponding to chains 37 and each connected to a frame clamp and bolt 39—38 fixed adjustably on the front parts of the main frame side members 36S.

In this modified construction, designed particularly for tractors with structural steel frames, the draw chain extends rearwardly centrally of and under the frame over the sheave 22 thence to the front end of the hitch member where any one of its links is engaged on the front pin 28 of the hitch member. Any surplus of chain rearward of the link connected at 28 is merely brought forward and its free end, provided with a hook 44', engaged on the chain forward of the sheave, as clearly shown in Fig. 9. Thus the chain will not drag on the ground.

In Figs. 9 and 10, 46 is a pin insertible in any of the apertures 34 of the sheave block, atop of plate 35, to retain the sheave at any desired height.

In Fig. 9, 36C' is a forward transverse frame bar corresponding to the rear adjustable frame bar 36C. Similar stirrups 41 and chain holding means 39 are used. Thus both the cross frame members are adjustable longitudinally of the frame and the draw chain suspension chains 37—44 are located accordingly.

In the form of my device adaptable for tractors without a structurel steel frame (see Fig. 8) the suspension chains 37 may have their outer and upper ends connected each directly in an eye or loop 45E of a bracket 45 secured one to each side of the transmission housing 19.

In the use of my device it will now be readily understood that in any of its forms, as illustrated, the pull of the tractor on an implement is from the front central part of the tractor and from a point higher than the point of connection to the implement. Intermediate said points the vertically adjustable sheave 22 (or equivalent thereof) is fixed at a height to cause downward pressure on the taut draw member. The flexibility of the combined draw and hitch parts will be readily seen. For example, if on a curve or on uneven ground, the tractor and implement do not line up the chain suspension means will compensate therefor and eliminate any undue side or vertical strains on the tractor, yet maintaining a taut draw member which will keep the implement in correct position relative to the tractor.

Modifications in details of the structure may be made without departing from the scope and spirit of my invention. For example, I may use an open loop in place of the sheave 23 and in which the draw chain may rest and press downwardly on a fixed, preferably flanged guide (not shown). As to the hitch members I prefer to use the flat type shown in Figs. 3, 4, and 5, but in any type of my hitches one object of making it extensible is to attain proper connection with various kinds of implements far enough rearwardly for ample clearance and as may be required for different kinds of implements.

I claim:

1. A draw and hitch device for tractors comprising a flexible draw member extending lengthwise under the tractor frame, the front end thereof secured near the central front part of the said tractor frame, means for flexibly supporting said draw member below and in proximity to the rear of the tractor frame at an elevation lower than the front connection described, said flexible support comprising a sheave suspended centrally of the member, a sheave block with a stem extending vertically, a transverse block through which said stem extends, means for adjusting said sheave block vertically to desired level, and flexible means such as chains connected to said transverse block and extending to opposite side parts of the tractor frame.

2. The structure specified in claim 1, and means for adjusting said sheave suspension means longitudinally of the tractor frame.

3. A tractor draw and hitch device for tractors having an elongated structural main frame, said tractor draw comprising a length of chain extending longitudinally under the frame, means adjacent the front end of the frame adjustable longitudinally thereof and supporting the front end of said draw member, flexible, transversely disposed means for supporting the draw member in vicinity of the rear end of the tractor frame, a draw support comprising in part a central draw member supporting sheave adjustable vertically to engage and support the draw member at predetermined level, and a suitable implement hitch securable to said draw member rearward of the transverse support.

STANLEY ASBURY.